US012771715B2

(12) United States Patent
Bjarnason et al.

(10) Patent No.: US 12,771,715 B2
(45) Date of Patent: Oct. 20, 2026

(54) DETECTING DDoS ATTACKERS USING INTERMEDIARIES

(71) Applicant: NetScout Systems, Inc., Westford, MA (US)

(72) Inventors: Steinthor Bjarnason, Fjerdingby (NO); Chris Conrad, Bastrop, TX (US)

(73) Assignee: NetScout Systems, Inc., Westford, MA (US)

(*) Notice: Subject to any disclaimer, the term of this patent is extended or adjusted under 35 U.S.C. 154(b) by 42 days.

(21) Appl. No.: 18/933,842

(22) Filed: Oct. 31, 2024

(65) Prior Publication Data

US 2026/0122106 A1 Apr. 30, 2026

(51) Int. Cl.
*H04L 29/06* (2006.01)
*H04L 9/40* (2022.01)

(52) U.S. Cl.
CPC ...... *H04L 63/1458* (2013.01); *H04L 63/1425* (2013.01)

(58) Field of Classification Search
CPC ............ H04L 63/1458; H04L 63/1425; H04L 12/40071; H04L 51/00; H04L 65/00; H04L 67/00; H04L 67/14; G05B 2219/33244; G05B 2219/15026; G05B 2219/33246; G05B 2219/31205; H04B 7/18584; H04M 15/8207; H04M 15/8214; H04M 2215/782; H04M 7/126; H04M 15/8228; H04M 2215/7833; H04W 80/10; G08B 5/223; H04N 1/00137; H04N 21/44209; H04N 21/44245; H04N 21/60; H04N 21/6125; H04N 21/65; H04N 21/654; H04N 21/658; H04N 2201/3278; H04N 2201/33385; H04Q 2201/802; H04Q 2201/808
See application file for complete search history.

(56) References Cited

U.S. PATENT DOCUMENTS

2021/0243267 A1* 8/2021 Fukuzaki ............ H04L 61/2503
2023/0171191 A1* 6/2023 Ignatchenko ........... H04L 69/16
370/392

* cited by examiner

*Primary Examiner* — Edward Zee
*Assistant Examiner* — Leynna Truvan
(74) *Attorney, Agent, or Firm* — Foley & Lardner LLP

(57) ABSTRACT

A system may include one or more memory devices storing instructions thereon that, when executed by one or more processors, cause the one or more processors to detect a transmission of a first data packet between a computing device and a server, determine a first amount of time elapsed between the transmission of the first data packet and a transmission of a second data packet, store the first amount of time in a data structure in a database, detect a transmission of a third data packet between the computing device and the server, determine a second amount of time elapsed between the transmission of the second data packet and the transmission of the third data packet, and determine that the computing device is utilizing a proxy device to communicate with the server.

20 Claims, 9 Drawing Sheets

DETECTING DDoS ATTACKERS USING INTERMEDIARIES

BACKGROUND

Attackers that launch distributed denial of service (DDoS) attacks may launch their attacks via proxies and/or intermediaries which increases the difficulty of mitigating the DDoS attacks.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
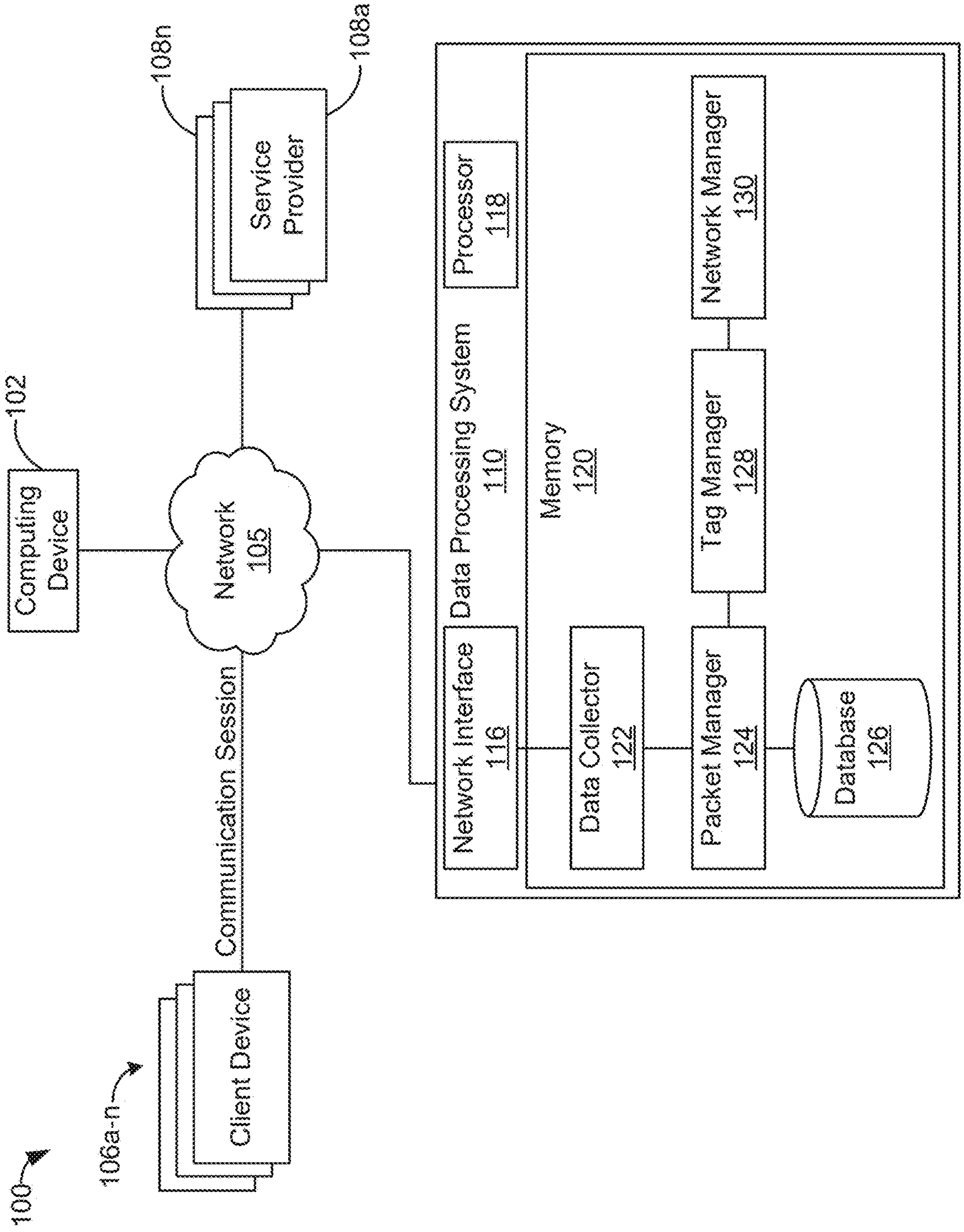
FIG. 1 is an illustration of a system for proxy device detection, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Application layer attacks often expose Internet Protocol (IP) addresses associated with devices and/or systems launching the attacks. As a result, IP addresses associated with attacking devices (e.g., devices launching the attacks) can be blacklisted. For example, the IP addresses can be shared between networks such that each network is aware of malicious devices. The sharing of the IP addresses allows for the devices to be blocked on a large scale such that the devices cannot launch attacks on subsequent networks. As a result, when a bot device is blacklisted, attackers may have to configure a new bot device for subsequent attacks.

The blacklisting of malicious devices has led to attackers implementing and/or using proxy devices, intermediary devices, and/or bots to launch network attacks. For example, the attackers may use open proxies on the Internet to shield and/or conceal an underlying IP address of the actual device executing the attack. The hiding of the IP address of the actual device results in the proxy device looking like the device that is launching the attack. As a result, the IP address of the proxy device is blacklisted instead of the IP address of the bot device. Even though the blacklisting of the proxy device will cause the attackers to switch to a new proxy device, it is estimated that millions of open proxies are located on the Internet. Accordingly, the attacker will simply use another set of proxy devices for the next attack.

The techniques described herein may overcome the aforementioned technical deficiencies in detecting if an attack is being sent via a proxy device. A computer may do so by analyzing inbound and output network traffic to determine the amount of time to establish communication between devices. For example, the computer may analyze network traffic to determine a round trip time (RTT) to establish communication for a given network layer. The computer can detect differences and/or discrepancies between the RTTs to determine when a proxy device is being used. For example, the computer can compare a client RTT in the transport layer with a client response time in the application layer. If the client is using a proxy device, the client RTT and the client response time will consume different amounts of time. For example, the difference in time may be in excess of 50 milliseconds.

The technology described herein may be used in various implementations. For example, the computer may execute passive proxy detection. In another example, the computer may execute active proxy detection. While executing passive proxy detection, the computer may monitor data packet exchanges to determine how time elapses between given data packets. Additionally, and/or alternatively, while executing active proxy detection, the computer may transmit one or more responses to cause the client to perform one or more actions.

In passive proxy detection, the computer may monitor data packet exchanges across one or more network layers. For example, the computer may monitor data packets across the transport layer. As another example, the computer may monitor data packets across the application layer. The computer may compare RTT for a first layer with RTT for a second layer. If a client device is utilizing a proxy device, a difference between the RTT for the first layer and the RTT for the second layer may be noticeable or be used to determine a proxy device is being used.

In active proxy device, the computer may trigger or cause the client device to perform one or more actions. The computer may determine that the client device is using a proxy device based on the amount of time it takes the client device to perform the actions. For example, the computer may transmit an application layer challenge. The application layer challenge will cause the client device to transmit a subsequent redirection response to the computer. The computer can determine a challenge RTT for the client device based on the amount of time elapsed between transmission of the application layer challenge and the subsequent redirection response. When the challenge RTT exceeds (e.g., takes longer) than the RTT to establish an underlying layer, the computer may determine that the client device is using a proxy device.

FIG. 1 is an illustration of a system 100 for network attribute analysis, in accordance with an implementation. The system 100 may enable detection of DDoS attacks by detecting variances, differences, and/or discrepancies between various amounts of elapsed time between transmission of data packets across networks. In brief overview, the system 100 can include, access, or otherwise interface with one or more of a data processing system 110 (e.g., a probe, an inspection device), that receives and/or stores data packets transmitted via a network 105 between client devices 106*a-n* (hereinafter client device 106 or client devices 106) and service providers 108*a-n*. The service providers 108 can each include a set of one or more servers 702, depicted in FIG. 7A, or a data center 708. The client device 106 may be an example of a user equipment (UE) or another device that can access the network 105. The client device 106 can communicate with the service providers 108 to access a service (e.g., a website, an application, etc.). The client device 106, the service provider 108, and the data processing system 110 can communicate or interface with via the network 105 or directly.

Each of the computing device 102, the client devices 106, the service providers 108, and/or the data processing system 110 can include or utilize at least one processing unit or other logic device such as programmable logic array engine, or module configured to communicate with one another or other resources or databases. The components of the computing device 102, the client devices 106, the service providers 108, and/or the data processing system 110 can be separate components or a single component. In some embodiments, the data processing system 110 may be an intermediary device between the client devices 106 and the service providers 108. In some embodiments, the computing device 102 may be an external device (e.g., a security device, a monitoring device, etc.). In some embodiments, the computing device 102, the service provider 108, the data processing system 110, or any combination thereof, may share at least some components or be the same device. The system 100 and its components can include hardware elements, such as one or more processors, logic devices, or circuits.

The computing device 102, the client devices 106, the service providers 108, and/or the data processing system 110 can include or execute on one or more processors or computing devices (e.g., computing device 703 depicted in FIG. 7C) and/or communicate via the network 105. The network 105 can include computer networks such as the Internet, local, wide, metro, or other area networks, intranets, satellite networks, and other communication networks such as voice or data mobile telephone networks. Via the network 105, the client device 106 can access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can communicate with the servers of the service providers 108 for data (e.g., a communication session including requests from the client devices 106 and responses from the service providers 108).

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), 3G, 4G, long term evolution wireless broadband communication ("LTE"), 5G, etc. Different types of data may be transmitted via different protocols, or the same types of data may be transmitted via different protocols. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

The service provider 108 can be a service provider that hosts different services or applications that can be accessed by computing devices, such as the computing device 102 and/or the client devices 106. The service provider 108 can be hosted by a third-party cloud service provider via a virtual environment, in some embodiments. The service provider 108 can be hosted in a public cloud, a co-location facility, or a private cloud, for example. The service provider 108 can be hosted in a private data center, or on one or more physical servers, virtual machines, or containers of an entity or customer. The service providers 108 may each be or include servers or computers configured to transmit or provide services across the network 105 to the client devices 106. The service providers 108 may transmit or provide such services upon receiving requests for the services from any of the client devices 106. The term "service" as used herein includes the supplying or providing of information over a network and is also referred to as a communications network service. Examples of services include 5G broadband services, any voice, data, or video service provided over a network, smart-grid network, digital telephone service, cellular service, Internet protocol television (IPTV), etc. The service may further include a SaaS application, such as a word processing application, spreadsheet application, presentation application, electronic message application, file storage system, productivity application, or any other SaaS application. The service provider 108 can be hosted or refer to cloud 710 depicted in FIG. 7B.

The client device 106 can establish communication sessions with the service providers 108 to receive data from the service providers 108. For example, a user associated with the client device 106 may request a service. Responsive to the request, a service provider 108 associated with the service may send requested data to the client device 106 in a communication session. The client devices 106 may establish communication sessions with the service providers 108 for any type of application or for any type of call.

The client device 106 can be located or deployed at any geographic location in the network environment depicted in FIG. 1. The client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 710 depicted in FIG. 7B). If the client device 106 is deployed in a cloud 710, the client device 106 can include or be referred to as a virtual client device or virtual machine. In the event the client device 106 is deployed in a cloud 710, the packets exchanged between the client device 106 and the service providers 108 can still be retrieved by the data processing system 110 from the network 105. The computing device 102 may be similar to client devices 106. In some cases, the client devices 106 and/or the data processing system 110 can be deployed in the cloud 710 on the same computing host in an infrastructure 716 (described below with respect to FIG. 7B).

The data processing system 110 may comprise one or more processors that are configured to obtain network data packets from network 105 during a communication session between the client device 106 and the service providers 108. In some embodiments, the data processing system 110 may refer to and/or include a network monitoring device. The data processing system 110 may comprise a network interface 116, a processor 118, and/or memory 120. The data processing system 110 may communicate with any of the computing device 102, the client devices 106, and/or the service providers 108 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

The memory 120 may include one or more of a data collector 122, a packet manager 124, a database 126, a tag manager 128, and/or a network manager 130. The data processing system 110 may further include other components, managers, handlers, etc. to perform the techniques as described herein. In brief overview, the components 122-130 may obtain a network data packet associated with a communication session between the client device 106 and a network service provider (e.g., the service providers 108). The components 122-130 may determine whether the network data packet includes characteristics of being sent via a proxy device.

The data collector 122 may comprise programmable instructions that, upon execution, cause the processor 118 to monitor one or more data packet exchanges. For example, the data collector 122 may monitor exchanges between the client device 106 and the service provider 108. In some embodiments, the data collector 122 may monitor encrypted data packet exchanges. For example, the data collector 122 may monitor encrypted data packet exchanges between one or more clients and a server. In some embodiments, a client may refer to a computer with a first IP address that initiates a session (e.g., a flow, communication, exchange, etc.) with a second computer having a second IP address.

The data collector 122 may obtain (e.g., receive, collect) data transmitted between the client devices 106 and the service providers 108 as part of a communication session. For example, the client device 106 may send a request for a service to the service provider 108. The service provider 108 may send a response to provide the service to the client device 106. The data collector 122 may receive the request from the service provider 108. The request may be associated with a normal request for the service, or the request may be associated with a malicious attack. In some embodiments, the data collector 122 may obtain data packet exchanges between the client devices 106 and the service providers 108.

The packet manager 124 may comprise programmable instructions that, upon execution, cause the processor 118 to monitor a plurality of data packet exchanges. For example, the packet manager 124 may monitor data packets or data packet exchanges obtained by the data collector 122. As another example, the packet manager 124 may retrieve, from one or more databases (e.g., the database 126), information obtained by the data collector 122. In some embodiments, the data packets, the data packet exchanges, and/or corresponding information may include IP addresses. For example, a given data packet exchange between a network device (e.g., the client device 106) and a server (e.g., the service provider 108) may include or otherwise transmit an IP address of the client device 106.

In some embodiments, the packet manager 124 may detect one or more data packet exchanges between the client devices 106 and the service provider 108. For example, the packet manager 124 may detect the data packet exchanges responsive to observing the establishment phase of one or more client connections. The packet manager 124 may observe the establishment phase of the one or more client connections by tracking handshakes between the client devices 106 and the service provider 108.

In some embodiments, the packet manager 124 may update or supplement the database 126 for a given amount of time. For example, the packet manager 124 may continuously update the database 126 by adding observed packet headers to the database 126 prior to detection of a network attack. As another example, the packet manager 124 may continuously update the database 126 by adjusting and/or updating a count that reflects a number of detected proxy devices on the network 105 for a predetermined amount of time (e.g., every fifteen minutes, every hour, every day, etc.).

In some embodiments, the packet manager 124 may detect transmissions of one or more data packets. For example, the packet manager 124 may detect a transmission of a synchronization message (e.g., a data packet that initiates communication). As another example, the packet manager 124 may detect a transmission of an acknowledgment message (e.g., a data packet that indicates a response). In some embodiments, the packet manager 124 may detect transmissions of one or more given data packets by extracting data from the data packets. For example, the packet manager 124 may detect an initiation of a transport control protocol (TCP) handshake by detecting the inclusion of a synchronize (SYN) flag in a given data packet. As another example, the packet manager 124 may detect a flag that indicates an initiation of a handshake protocol. In some embodiments, the data packets may include one or more numbers and/or tokenized values. For example, the data packets may include sequence numbers. As another example, the data packets may include packet identifiers.

In some embodiments, the packet manager 124 may detect one or more data packets based on information stored in the database 126. For example, the data collector 122 may store scraped and/or extracted data in the database 126. The packet manager 124 may retrieve, from the database 126, the data extracted by the data collector 122. For example, the packet manager 124 may retrieve one or more flags extracted from given data packets. In some embodiments, the packet manager 124 may detect a transmission of a first data packet. For example, the packet manager 124 may detect a transmission of a data packet between the service provider 108 and the client device 106. In some embodiments, the first data packet may initiate an establishment of a communication session. For example, the first data packet may represent a response to a message sent by an initiator (e.g., the client device 106, the service provider 108, etc.). In some embodiments, the first data packet may include one or more flags. For example, the first data packet may include an acknowledgment (ACK) flag. The ACK flag may provide an indication that the first data packet is a response to a SYN message. In some embodiments, the first data packet may refer to and/or represent the SYN-ACK message in a TCP three-way handshake.

In some embodiments, the packet manager 124 may monitor and/or track an amount of time that elapses between the transmission of data packets. For example, the packet manager 124 may track an amount of time that elapses between the transmission of the SYN-ACK message by the service provider (e.g., the first data packet) and the transmission of an ACK message by the client device (e.g., a second data packet). Stated otherwise, the packet manager 124 may track the round trip time (RTT) between the transmission of a first data packet and a second data packet. In some embodiments, the RTT may represent an amount of time that elapses between the transmission of a data packet, by the service provider 108, and the transmission of a response by the client device 106.

In some embodiments, the packet manager 124 may determine an amount of time elapsed between data packets. For example, the packet manager 124 may determine an amount of time elapsed between the first data packet and the second data packet. Stated otherwise, the packet manager 124 may determine the RTT between an SYN-ACK message and an ACK message. In some embodiments, the packet manager 124 may store one or more amounts of time in the database 126. For example, the packet manager 124 may store the first amount of time in a data structure and/or as a data string. The packet manager 124 may tag and/or otherwise label the amounts of time. For example, the packet manager 124 may apply tags to one or more sets of information such that one or more amounts of time are stored according to IP address. As another example, the packet manager 124 may apply tags to one or more sets of information such that the amounts of time are stored according to network layer (e.g., a first set of information is tagged with a first tag to indicate transport layer, a second set of information is tagged with a second tag to indicate session layer, etc.).

In some embodiments, the packet manager 124 may monitor subsequent interactions between the client device 106 and the service provider 108. For example, the packet manager 124 may query the database 126 for subsequent data packets using an IP address for the client device 106 and/or the service provider 108. The packet manager 124 may query the database 126 for a given IP address associated with transmission of the second data packet. For example, the packet manager 124 may query the database 126 for an IP address of a given client device 106. In some embodiments, the packet manager 124 may monitor information transmitted across a bus. For example, the packet manager 124 may monitor information that the data collector 122 is transmitted to the database 126 via a common bus.

In some embodiments, the packet manager 124 may detect one or more subsequent data packets. For example, the packet manager 124 may detect a transmission of a third data packet between the service provider 108 and the client device 106. The third data packet may refer to and/or represent subsequent communication between devices. For example, the third data packet may refer to communication that occurs responsive to establishment of a communication session. In some embodiments, the subsequent communication may occur at a higher layer. For example, the first data packet may correspond to a first layer of a network architecture and the third data packet may correspond to a second layer of the network architecture.

In some embodiments, the client device 106 and/or computing device may transmit the third data packet responsive to one or more data packets transmitted by the service provider 108. For example, the service provider 108 may transmit an HTTP redirection response to the client device 106. The HTTP redirection response can prompt the client device 106 to transmit a response. In some embodiments, the response may refer to and/or include the third data packet. Stated otherwise, the client device 106 may transmit the third data packet as a response to the HTTP redirection response. As another example, the packet manager 124 may cause the service provider 108 to transmit a redirection response to trigger execution of one or more actions by the client device 106.

In some embodiments, the first layer may refer to and/or include the transport layer of the Open Systems Interconnection (OSI) model (e.g., a network architecture). Additionally, and/or alternatively, the second layer may refer to and/or include the session layer of the OSI model. Stated otherwise, the second layer may be higher than the first layer. As another example, the first layer may refer to and/or include the TCP layer of the TCP/IP model or a user datagram protocol (UDP) layer, and the second layer may refer to and/or include the application layer.

In some embodiments, at least one of the data packets described herein may include data and/or information that pertains to a given network layer. For example, the first data packet may include a first initial sequence number given that the first data packet corresponds to transport layer communication. As another example, the second data packet may include a second initial sequence number. In some embodiments, the data and/or information in accordance with the layer may assist the packet manager 124 with pairing and/or grouping data packets. For example, the first initial sequence number may assist the packet manager 124 in determining that the first data packet is a SYN message. As another example, the second initial sequence number may assist the packet manager 124 in determining that the second data packet is an ACK message.

In some embodiments, the packet manager 124 may determine an amount of time elapsed between the establishment of a communication session, at a first layer, and the subsequent transmission of a data packet at a second layer. For example, the packet manager 124 may determine an amount of time that elapsed between transmission of an ACK message at the transport layer and a transmission of a data packet at the session layer. As another example, the packet manager 124 may determine an amount of time elapsed between the second data packet and the third data packet.

In some embodiments, the packet manager 124 may determine that a given client device 106 is utilizing a proxy device. For example, the packet manager 124 may determine that the given client device 106 is controlling a proxy device to communicate with a given service provider 108. As another example, the packet manager 124 may determine that a proxy device is transmitting one or more data packets on behalf of a client device 106. In some embodiments, the packet manager 124 may determine that a computing device (e.g., the client device 106) is utilizing a proxy device based on a difference between one or more amounts of time. For example, the packet manager 124 may determine a difference between an amount of time to establish a communication session of a first layer and an amount of time to transmit a subsequent data packet at a second layer (e.g., a higher layer). As another example, the packet manager 124 may determine a difference between a RTT in the transport layer and a subsequent transmission in the session layer. In some embodiments, the packet manager 124 may determine that computing device is using a proxy device when the amount of time that elapsed between transmission of an upper layer data packet exceeds the amount of time that elapsed to establish a communication session at a lower layer.

In some embodiments, the packet manager 124 may store and/or otherwise record IP addresses associated with the proxy devices. For example, the packet manager 124 may record the IP address associated with a device that transmitted the second data packet as a proxy device. As another example, the packet manager 124 may record the IP address associated with transmission of the third data packet as a proxy device. In some embodiments, when a given client device 106 is utilizing a proxy device, the source IP address of one or more data packets, transmitted to the service provider 108, can be the IP address of the proxy device.

In some embodiments, the packet manager 124 may update one or more counts. For example, the packet manager 124 may maintain and update (e.g., increment) a count in the database 126. In some embodiments, the packet manager 124 may update a count that represents a number of computing devices utilizing proxy devices. For example, as the packet manager 124 detects that a given client device 106 is using a proxy device, the packet manager 124 may update the count in the database 126. In some embodiments, the packet manager 124 may also update the count in the database 126 to remove a given computing device. For example, the packet manager 124 may determine that communication between a proxy device and the service provider 108 has ended. In this example, the packet manager 124 may update the count to decrease the count by 1.

In some embodiments, the packet manager 124 may compare the number of computing devices (using proxy devices) with one or more thresholds. For example, the network 105 may include a predetermined threshold that represents the number of proxy devices that can communicate on the network 105. The packet manager 124 may determine that the number of computing devices (based on the count) exceeds the predetermined threshold. In some embodiments, the packet manager 124 may detect a network attack. For example, the packet manager 124 may determine that the network 105 is likely under a network attack responsive to determining that the number of proxy devices exceeds a predetermined threshold. The packet manager 124 may detect the network attack as a high number of proxy devices is indicative of a network attack based on a correlation between proxy device utilization and network attacks. In some embodiments, the network attack may refer to and/or include one or more distributed denial of service (DDoS) attacks.

As an example, the packet manager 124 may detect a large increase in clients connecting via proxies (e.g., the number and/or rate of devices using proxy devices has increased). The large increase in clients connecting via proxies could represent a high probability of the initial phase of an inbound DDoS attack. In this example, the detection of the large increase in clients connecting via proxies could serve as a trigger to create and/or issue an alert and/or switch to active mitigation mode. To continue this example, during an active mitigation, the packet manager 124 can flag clients connecting via proxies as highly suspicious. The flagged clients could be subsequently rate limited and/or blocked from the network.

The tag manager 128 may comprise programmable instructions that, upon execution, cause the processor 118 to apply one or more tags to network devices. In some embodiments, the tag manager 128 may apply one or more tags to network devices by updating or storing flags, in a database (e.g., the database 126), that indicates that the one or more network devices (e.g., IP addresses of the one or more network devices) have been tagged. For example, the tag manager 128 may apply tags to a given client device 106 by updating a status of the given client device 106 in the database. In some embodiments, the tag manager 128 may apply tags to IP addresses based on the IP addresses being flagged as proxy devices. For example, the tag manager 128 may apply a tag to a given IP address based on a determination that the given IP address is a proxy device.

In some embodiments, the network manager 130 may comprise programmable instructions that, upon execution, cause the processor 118 to execute one or more analysis routines. For example, the network manager 130 may execute a session analysis routine on one or more network devices associated with IP addresses tagged by the tag manager 128. In some embodiments, the network manager 130 may execute the session analysis routines responsive to application of tags by the tag manager 128. For example, the network manager 130 may be notified when a given IP address is tagged by the tag manager 128. The network manager 130 may perform the session analysis routines responsive to the notification by the tag manager 128 or responsive to the tags.

The network manager 130 can adjust tags on IP addresses based on the session analysis routines. For example, the network manager 130 can determine that a tagged IP address exhibited malicious activity based on the results from the session analysis routines applied to the IP address. Responsive to doing so, the network manager 130 can add a tag to the IP address to indicate that the IP address is malicious or a known attacker. The network manager can implement one or more subsequent actions responsive to adding the tag to the IP address The network manager 130 can mitigate network attacks. The network manager 130 can do so based on the tags and/or the analysis routines as described above. For example, responsive to identifying an IP address that has been tagged (e.g., by a proxy tag or a malicious tag), the network manager 130 can block, throttle, or otherwise reduce network traffic originating from or directed to the IP address or transmit a message to a device of the network 105 that controls or facilitates network traffic across the network 105 that causes the device to similarly mitigate network traffic originating from or directed to the IP address. In another example, the network manager 130 can perform one or more analysis routines on a tagged IP address and determine one or each of the analysis routines fails for the IP address. Responsive to the determination, the network manager 130 can determine the IP address is malicious (e.g., the IP address is participating in malicious activity) and mitigate network traffic originating from or directed to the IP address as described above.

In some embodiments, the network manager 130 may block one or more proxy devices. For example, the network manager 130 may prohibit the service providers 108 from responding to one or more data packets associated with IP addresses that were tagged by the tag manager 128. As another example, the network manager 130 may halt communication on the network 105 for one or more devices having IP addresses flagged as corresponding to proxy devices.

Figure 2:
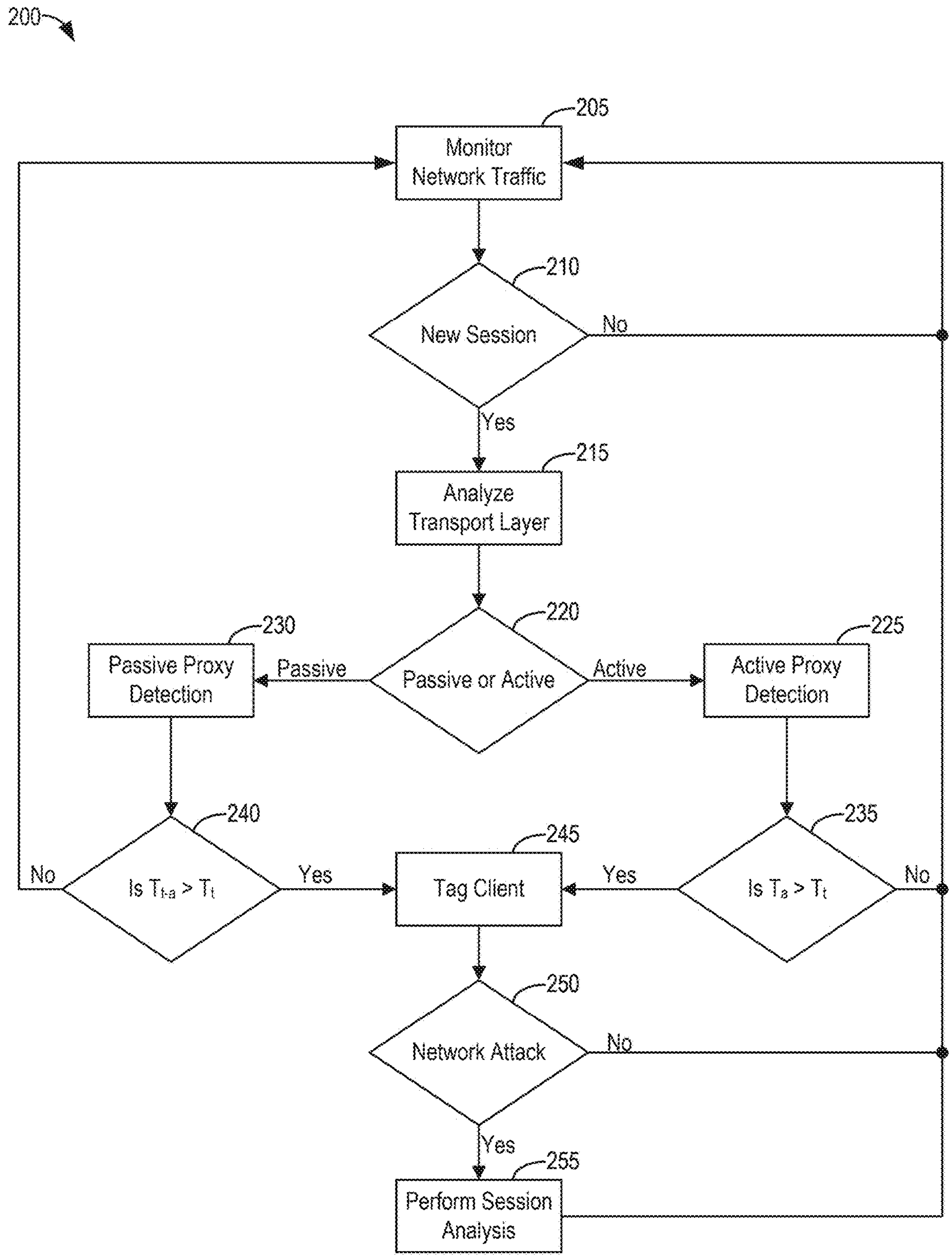
FIG. 2 is an illustration of a flow diagram of a process for proxy device detection, in accordance with an implementation.

FIG. 2 is an illustration of a flow diagram of a process 200 for proxy device detection, in accordance with an implementation. The process 200 can be performed by a data processing system (the data processing system 110, shown and described with reference to FIG. 1). The process 200 may include more or fewer operations and the operations may be performed in any order. Performance of the process 200 may enable the data processing system to detect utilization of proxy devices by one or more computing devices to perform a network attack (e.g., a DOS attack or a DDoS attack).

At operation 205, the data processing system monitors network traffic. For example, the data processing system may monitor network traffic across the network 105. As another example, the data processing system may monitor network traffic exchanged between the client devices 106 and the service providers 108. In some embodiments, the data processing system may obtain one or more data packet exchanges while monitoring network traffic. For example, the data processing system may obtain data packets transmitted by an initiating device (e.g., an initiator).

At operation 210, the data processing system may determine whether a new session has occurred. For example, the data processing system may determine if one or more data packets, monitored in operation 205, indicate initiating of new sessions. As another example, the data processing system may determine whether any SYN packets (e.g., initiation of a TCP three-way handshake) have been transmitted. As even another example, the data processing system may determine if communication on the transport layer is occurring. In some embodiments, the process 200 may return to operation 205 responsive to a determination that no new sessions have occurred. In some embodiments, the process 200 may proceed to operation 215 responsive to determining that a new session has occurred.

In operation 215, the data processing system may analyze the transport layer. For example, the data processing system may analyze data packets corresponding to a TCP three-way handshake. As another example, the data processing system may analyze data packets to detect given SYN packets and/or corresponding ACK packets. In some embodiments, the data processing system may determine one or more amounts of time. For example, the data processing system may determine an amount of time ($T_t$) that has elapsed while a client device (e.g., computing device) communicates with a server.

In some embodiments, $T_t$ may refer to and/or include a transport layer RTT for a client. For example, $T_t$ may represent an amount of time elapsed between a destination (e.g., a server) sending a transport layer packet to a client and the destination receiving a corresponding transport layer reply from the client. As another example, $T_t$ may represent a time interval between the destination sending a SYN-ACK to the client and the destination receiving the corresponding ACK from the client as part of a TCP three-way handshake.

In operation 220, the data processing system may determine whether passive detection or active detection is being implemented. For example, the data processing system may determine whether a computing device has provided inputs to indicate passive detection or active detection. Stated otherwise, the data processing system may perform active proxy detection based on one or more first signals and/or the data processing system may perform passive proxy detection based on one or more second signals. In some embodiments, the process 200 may proceed to operation 225 responsive to a determination that the data processing system is to operate in active proxy detection. In some embodiments, the process 200 may proceed to operation 230 responsive to a determination that the data processing system is to operate in passive proxy detection.

In operation 225, the data processing system may perform active proxy detection. For example, the data processing system may transmit one or more application layer challenges to a client device. In some embodiments, the data processing system may transmit the application layer challenges responsive to establishment of a communication session at the transport layer (e.g., a lower network). For example, the data processing system may transmit application layer challenges upon completion of the TCP three-way handshake. In some embodiments, the data processing system may determine one or more amounts of time while performing active proxy detection. For example, the data processing system may determine an amount of time ($T_a$) that has elapsed between transmission of a challenge, by the destination to the client, and receipt of a corresponding application lay replay from the client. Stated otherwise, $T_a$ may refer to and/or represent how much time it takes between transmitting a challenge and then receiving the corresponding response.

In operation 235, the data processing system may determine whether $T_a$ is larger than $T_t$. For example, the data processing system may compare the values determined in operation 215 and operation 225. In some embodiments, the data processing system may compare the values to determine a difference between $T_a$ and $T_t$. For example, the data processing system may determine if the application layer challenge time interval (e.g., $T_a$) represent a greater amount of time relative to the transport layer RTT (e.g., $T_t$). In some embodiments, the data processing system may compare the time amounts based on one or more thresholds. For example, the data processing system may determine whether a difference between $T_a$ and $T_t$ is less than 50 milliseconds. In some embodiments, the process 200 may return to operation 205 responsive to a determination that $T_a$ is not larger than $T_t$. In some embodiments, the process 200 may proceed to operation 245 responsive to a determination that $T_a$ is larger than $T_t$.

In operation 230, the data processing system may perform passive proxy detection. For example, the data processing system may track the amount of time that elapses between the successful establishment of a communication session on a first layer and the subsequent transmission of a data packet on a second layer (e.g., higher layer). Stated otherwise, the data processing system may determine that amount of time that elapses between establishing the transport layer and the transmission of the first higher layer (e.g., session layer, application layer, etc.) by the client. In some embodiments, the data processing system may determine one or more amounts of time. For example, the data processing system may determine an amount of time $T_{t-a}$, which represents the RTT that occurs when switching from a lower layer (e.g., transport layer) to a higher layer (e.g., session layer, application layer).

In operation 240, the data processing system may determine whether $T_{t-a}$ is larger than $T_t$. For example, the data processing system may determine a difference between the RTT time to establish the transport layer with the RTT prior to transmission of the first higher layer data packet. As another example, the data processing system may determine if the difference between $T_{t-a}$ and $T_t$ is larger than a given threshold. For example, the threshold may be 30 milliseconds. Stated otherwise, $T_{t-a}$ is not larger than $T_t$ if the absolute value of the difference between the two time values is less than 30 milliseconds. In some embodiments, the process 200 may return to operation 205 responsive to a determination that $T_{t-a}$ is not larger than $T_t$. In some embodiments, the process 200 may proceed to operation 245 responsive to a determination that $T_{t-a}$ is larger than $T_t$.

In operation 245, the data processing system may tag one or more clients. For example, the data processing system may tag the IP address that is associated with the client device that transmitted one or more of the data packets described herein. In some embodiments, the data processing system may tag the clients as proxy devices based on the establishment of higher layer communication sessions consuming a larger amount of time relative to the establishment of lower layer communication sessions. The data processing system may tag the clients by updating one or more counts and/or trackers with a record of the IP address.

In operation 250, the data processing system may determine whether a network attack has been detected. For example, the data processing system may determine whether one or computing devices are performing network flooding. In some embodiments, the process 200 may return to operation 205 responsive to a determination that there is not a network attack. In some embodiments, the process 200 may proceed to operation 255 responsive to a determination that a network attack has been detected.

In operation 255, the data processing system may perform client session analysis. For example, the data processing system may analyze established sessions for one or more clients tagged in operation 245. As another example, the data processing system may perform session analysis for one or more devices that were determined to be associated with $T_{t-a}$ values and/or $T_a$ values that were larger than corresponding $T_t$ values.

Figure 3:
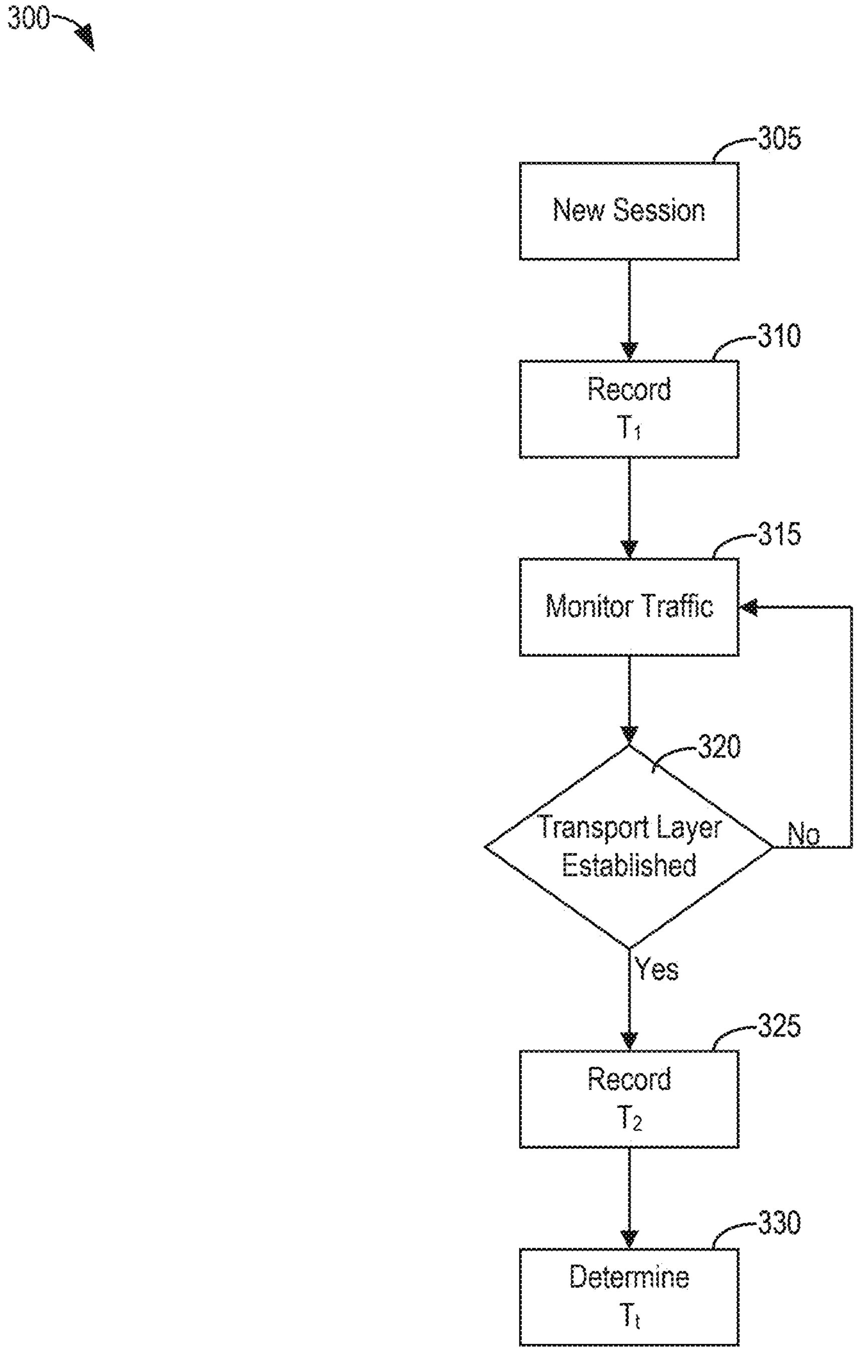
FIG. 3 is an illustration of a flow diagram of a process for proxy device detection, in accordance with an implementation.

FIG. 3 is an illustration of a flow diagram of a process 300 for proxy device detection, in accordance with an implementation. The process 300 can be performed by a data processing system (the data processing system 110, shown and described with reference to FIG. 1). The process 300 may include more or fewer operations and the operations may be performed in any order. Performance of the process 300 may enable the data processing system to detect proxy devices. In some embodiments, the process 300 may include one or more operations similar to that of the process 200. In some embodiments, the data processing system may repeat, replicate, or otherwise reproduce the process 300 or one or more operations thereof may while the data processing system is operating in a monitor mode. The process 300 and/or one or more steps thereof may be included in one or more steps of the process 200. For example, operation 215 may include the performance of the process 300 and/or one or more operations thereof.

At operation 305, the data processing system detects a new session. For example, the data processing system may detect receipt of a data packet by a destination device. As another example, the data processing system may detect transmission of a data packet. In some embodiments, the data processing system may detect that transmission of one or more data packets on a given layer. For example, the data processing system may detect that transmission of a given data packet of the TCP three-way handshake.

At operation 310, the data processing system records an amount of time $T_1$. For example, the data processing system may record a timestamp that represents when the session of operation 305 may detected and/or initiated. Stated otherwise, the data processing system may record a start time that represents when the destination responded to the client.

At operation 315, the data processing system monitors network traffic. For example, the data processing system monitors one or more data packets exchanged on a network. As another example, the data processing system may evaluate data that was extracted from the data packets. In some embodiments, the data processing system may monitor header values to search for one or more data packets. For example, the data processing system may search for ACK headers (e.g., a header which indicates a client's reply to a SYN-ACK data packet).

At operation 320, the data processing system determines whether the transport layer has been established. For example, the data processing system may determine whether a client device and a destination device have completed the TCP three-way handshake. As another example, the data processing system may determine whether a client device has transmitted a replay to one or more messages of the destination. In some embodiments, the process 300 may return to operation 315 responsive to a determination that the transport layer has not been established. In some embodiments, the process 300 may proceed to operation 325 responsive to a determination that the transport layer has been established.

At operation 325, the data processing system records an amount of time $T_2$. For example, the data processing system may record an amount of time since recording the time $T_1$. As another example, the data processing system may record a timestamp associated with the establishment of the transport layer (e.g., what time it was when the transport layer was established). In some embodiments, the data processing system may extract the timestamps from one or more data packets. For example, the data processing system may extract the timestamp, associated with when the transport layer was established, from a data packet that included the ACK header.

In operation 330, the data processing system determines time $T_t$. For example, the data processing system may take the absolute value of the difference between time $T_1$ and $T_2$. Stated otherwise, the time $T_1$ may represent how much time elapsed between the detection of a new session and the corresponding establishment of the transport layer.

Figure 4:
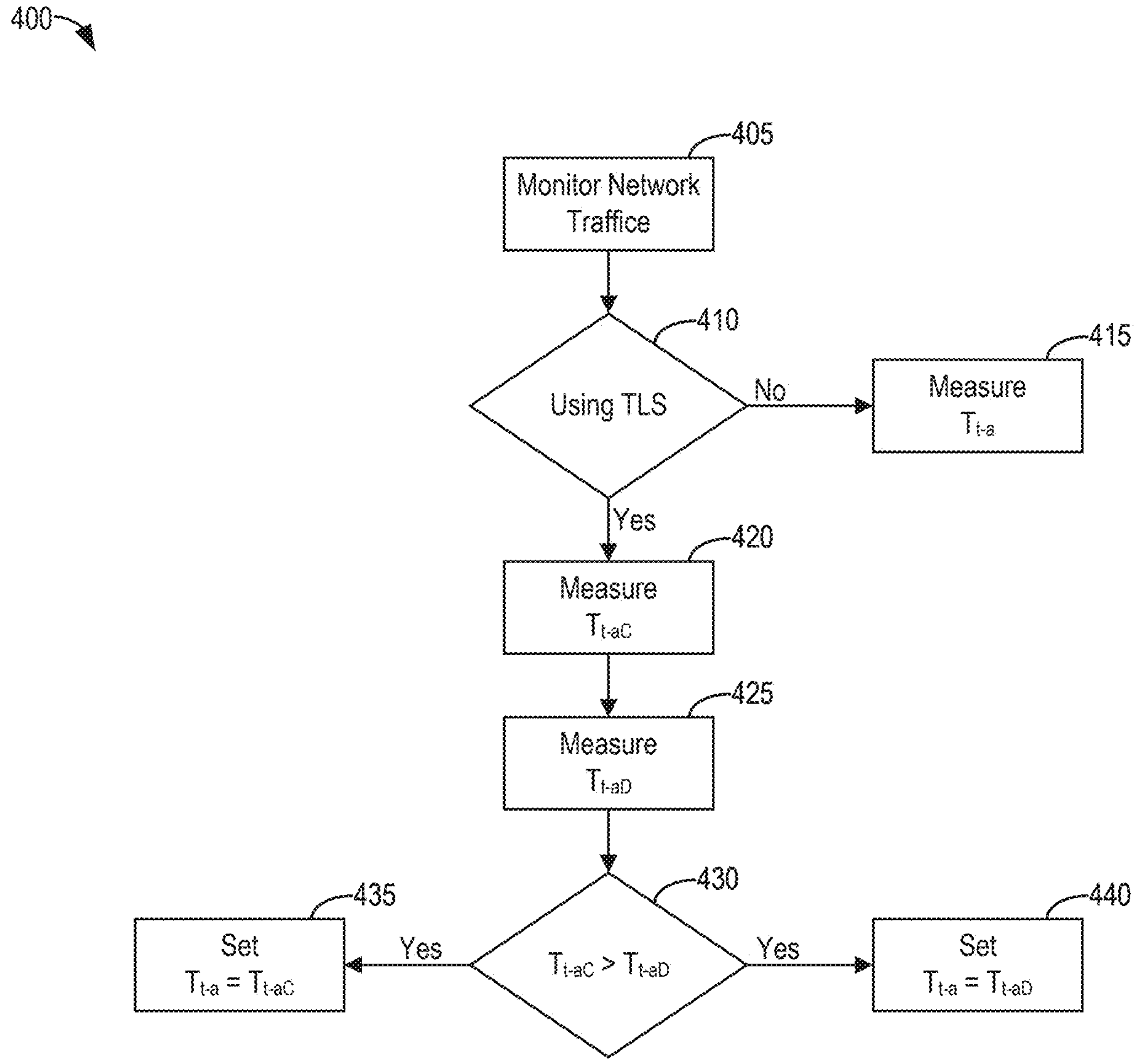
FIG. 4 is an illustration of a flow diagram of a process for passive proxy device detection, in accordance with an implementation.

FIG. 4 is an illustration of a flow diagram of a process 400 for passive proxy detection, in accordance with an implementation. The process 400 can be performed by a data processing system (the data processing system 110, shown and described with reference to FIG. 1). The process 400 may include more or fewer operations and the operations may be performed in any order. Performance of the process 400 may enable the data processing system to passively detect one or more proxy devices. In some embodiments, the data processing system may repeat, replicate, or otherwise reproduce the process 400 or one or more operations thereof may while the data processing system is operating in a monitor mode. Implementation of the process 400 and/or one or more portions thereof may be included in and/or executed in operation 230.

At operation 405, the data processing system monitors network traffic. For example, the data processing system may monitor the transmission of data packets across a network. In some embodiments, the data processing system may retrieve data, from one or more databases, to evaluate information associated with one or more data packets. For example, the data processing system may retrieve headers that were extracted from one or more data packets. In some embodiments, the data processing system may detect one or more sessions between client devices and destination devices. For example, the data processing system may detect the initiation of transport layer security (TLS) session.

At operation 410, the data processing system determines whether TLS is being used by one or more devices. For example, the data processing system may determine if a client device is using TLS to communicate with a destination device. As another example, the data processing system may determine if the client device and the destination device are communicated via encrypted messages. In some embodiments, the process 400 may proceed to operation 415 if the devices are not using TLS. In some embodiments, the process 400 may proceed to operation 420 if the devices are using TLS.

In operation 415, the data processing system may measure time $T_{t-a}$. For example, the data processing system may determine that amount of time that elapses between the establishment of the transport layer and a subsequent transmission of a data packet on a higher layer.

In operation 420, the data processing system may measure time $T_{t-aC}$. In some embodiments, $T_{t-aC}$ may refer to and/or represent one or more amounts of time associated with TLS communication. For example, time $T_{t-aC}$ may correspond to the amount of time elapsed between the establishment of the transport layer and the transmission of an initial TLS ClientHello data packet, from the client device to the destination.

In operation 425, the data processing system may measure time $T_{t-aD}$. In some embodiments, time $T_{t-aD}$ may refer to and/or represent one or more amounts of time associated with TLS communication. For example, time $T_{t-aD}$ may correspond to the amount of time elapsed between the transmission of a TLS ClientHello data packet and a subsequent TLS AppData data packet from the client to the destination.

In operation 430, the data processing system may determine whether time $T_{t-aC}$ is larger than time $T_{t-aD}$. For example, the data processing system may compare the time amounts measured in operation 420 with the time amounts measured in operation. In some embodiments, the process 400 may proceed to operation 435 responsive to a determination that time $T_{t-aC}$ is larger than time $T_{t-aD}$. In some embodiments, the process 400 may proceed to operation 440 responsive to a determination that time $T_{t-aC}$ is not larger than time $T_{t-aD}$.

In operation 435, the data processing system sets time $T_{t-a}$ as time $T_{t-aC}$. For example, the data processing system may utilize the time $T_{t-aC}$ during operation 230. As another example, the data processing system may utilize the time $T_{t-aC}$ while evaluating the time $T_{t-a}$. In operation 440, the data processing system sets time $T_{t-a}$ as time $T_{t-aD}$. For example, the data processing system may utilize the time $T_{t-aD}$ during operation 230. As another example, the data processing system may utilize the time $T_{t-aD}$ while evaluating the time $T_{t-a}$.

As an example, if a client device is utilizing and/or executing transport layer proxies (SOCKS), the client device will first establish a transport layer session to the proxy device. The client device can instruct the proxy device to connect to the destination. The client device can wait for the proxy device to signal that the transport layer has been established with the destination. Once the client device receives an indication from the proxy device, the client device can instruct the proxy device to transmit session layer and/or application layer packets to the destination. To continue this example, if the client device connects with the destination, via a SOCKS proxy, the time $T_t$ can measure the transport layer response time between the SOCKS proxy and the destination, and the time $T_{t-a}$ value can measure the time needed for the client to switch from transport layer to session/application layer processing. The $T_{t-a}$ value will be considerable larger than the $T_t$ value due to the client and the proxy being in different physical locations.

As another example, if the client device is utilizing other protocols with transport layer proxies, the first higher layer packet will be sent after the proxy device has established the transport layer connection between the proxy device and the destination. Measuring the time from the TCP three-way handshake to seeing the first higher layer packet will give the $T_{t-a}$ value.

As another example, if the client device is utilizing TLS bridging proxies (HAProxy, SQUID) the client device can establish both a transport layer and a session layer connection to the proxy device. The proxy device can in turn establish both a transport layer and a session layer connection to the destination. The client may not transmit any subsequent data packets until the proxy device provides an indication that the transport layer and session layer connections have been established with the destination. To continue this example, the client the time $T_t$ can measure the transport layer response time between the proxy device and destination. The time $T_{t-aD}$ can measure the time from the client device sending the first application data packet to the TLS Bridging proxy and the TLS bridging proxy device in turn transmit the first application data packet to the destination. The time $T_{t-aC}$ can measure the time for the TLS Bridging proxy to start establishing the TLS tunnel between the proxy device and the destination. In this example, the time $T_{t-aD}$ is likely to be larger than time $T_{t-aC}$ and as such, can be used at the time $T_{t-a}$ value.

As another example, for directly connected clients (e.g., no proxy devices), the time $T_t$ can measure the transport layer response time between the client and the destination. To continue this example, the time $T_{t-a}$ can measure the time needed to send the first session/application layer packet after finishing the TCP 3-way handshake. In this example, given that the devices are directly connected, the time $T_t$ and $T_{t-a}$ values will be similar to each other with the time $T_{t-a}$ value being potentially slightly larger than the time $T_t$ value due to application layer processing time.

Figure 5:
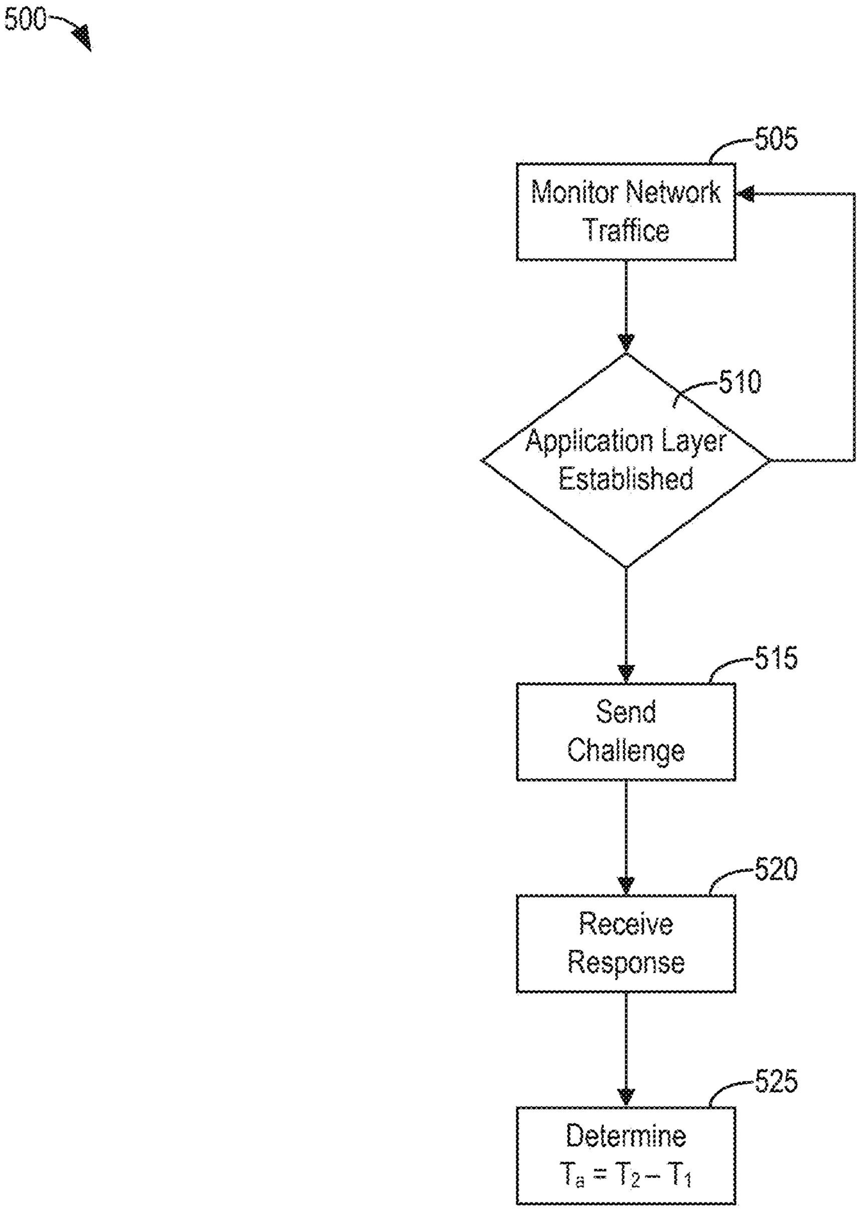
FIG. 5 is an illustration of a flow diagram of a process for active proxy device detection, in accordance with an implementation.

FIG. 5 is an illustration of a flow diagram of a process 500 for active proxy detection, in accordance with an implementation. The process 500 can be performed by a data processing system (the data processing system 110, shown and described with reference to FIG. 1). The process 500 may include more or fewer operations and the operations may be performed in any order. Performance of the process 500 may enable the data processing system to actively detect one or more proxy devices. In some embodiments, the data processing system may repeat, replicate, or otherwise reproduce the process 500 or one or more operations thereof may while the data processing system is operating in a monitor mode. Implementation of the process 500 and/or one or more portions thereof may be included in and/or executed in operation 225.

In operation 505, the data processing system monitors network traffic. For example, the data processing system may monitor the transmission of data packets across a network. In some embodiments, the data processing system may retrieve data, from one or more databases, to evaluate information associated with one or more data packets. For example, the data processing system may retrieve headers that were extracted from one or more data packets. In some embodiments, the data processing system may detect one or more sessions between client devices and destination devices. For example, the data processing system may detect the initiation of the application layer session.

In operation 510, the data processing system determines whether an application layer session has been established between the client and the destination devices. For example, the data processing system may determine if a client device is using a HTTP session to communicate with a destination device. As another example, the data processing system may determine if a client device is using one or more of a DNS session, a SIP session, or a TLS session to communicate with a destination device. In some embodiments, the process 500 may proceed to operation 515 if the devices are using HTTP. In some embodiments, the process 500 may return to operation 505 if the devices are not using HTTP.

In operation 515, the data processing system sends a challenge. For example, the data processing system may send an HTTP redirection response to the client. In some embodiments, the data processing system may record and/or store a timestamp associated with sending the challenge (e.g., record when the challenge was sent). For example, the data processing system may record a time $T_1$ that indicates when the challenge was sent to the client. The transmission of the challenge may trigger and/or cause the client to perform one or more actions. For example, the challenge may cause the client to transmit a new request to the destination. In some embodiments, the data processing system may send the challenge responsive to an initial application layer from the client.

In operation 520, the data processing system receives a response. For example, the data processing system may receive a response to the challenge sent in operation 505. In some embodiments, the data processing system may record and/or store a timestamp associated with transmission of the response. For example, the data processing system may record a time $T_2$ that indicates when the response to the challenge was sent by the client and/or received by the destination.

In operation 525, the data processing system determines time $T_a$. For example, the data processing system may determine the absolute value of the difference between time $T_2$ and time $T_1$. As another example, the amount of time elapsed, between the time $T_1$ and the time $T_2$, may represent the time $T_a$.

As an example, if a client device is connecting via HTTP, the destination device (or a DDoS mitigation device) can send a 302 response (e.g., an HTTP Redirection response) to the initial application layer request. The 302 response can force the client to send a new request to the destination. Additionally, and/or alternatively, the data processing system may determine time $T_a$ by at least one of HTTP Javascript redirection, SIP "Redirect Server," and/or DNS domain redirection.

As another example, if the client device is utilizing and/or executing external proxy devices, the time $T_t$ value can measure the transport layer response time between the external proxy device and the destination. The time $T_a$ value can measure the application layer response time between the client and the destination. Given that the client device is utilizing an external proxy device, the time $T_a$ value is likely to be larger than the time $T_t$ value. This is the result of the client device and the external proxy device being located in different physical locations. In this example, if the time $T_a$ value is larger than the time $T_t$ value, from example by more than 50 milliseconds, then the client is connecting via a proxy device and the source IP address represents the proxy IP address, not the real client.

As another example, if the client device is directly connected to the destination, the time $T_t$ value can measure the transport layer response time between the client and the destination. The time $T_a$ value can measure the application layer response time between the client and the destination. For directly connected clients, the time $T_t$ value and the time $T_a$ value will be similar (e.g., difference between values is less than 50 milliseconds) to each other with the time $T_a$ value slightly larger than the time $T_t$ value due to application layer processing time.

Figure 6:
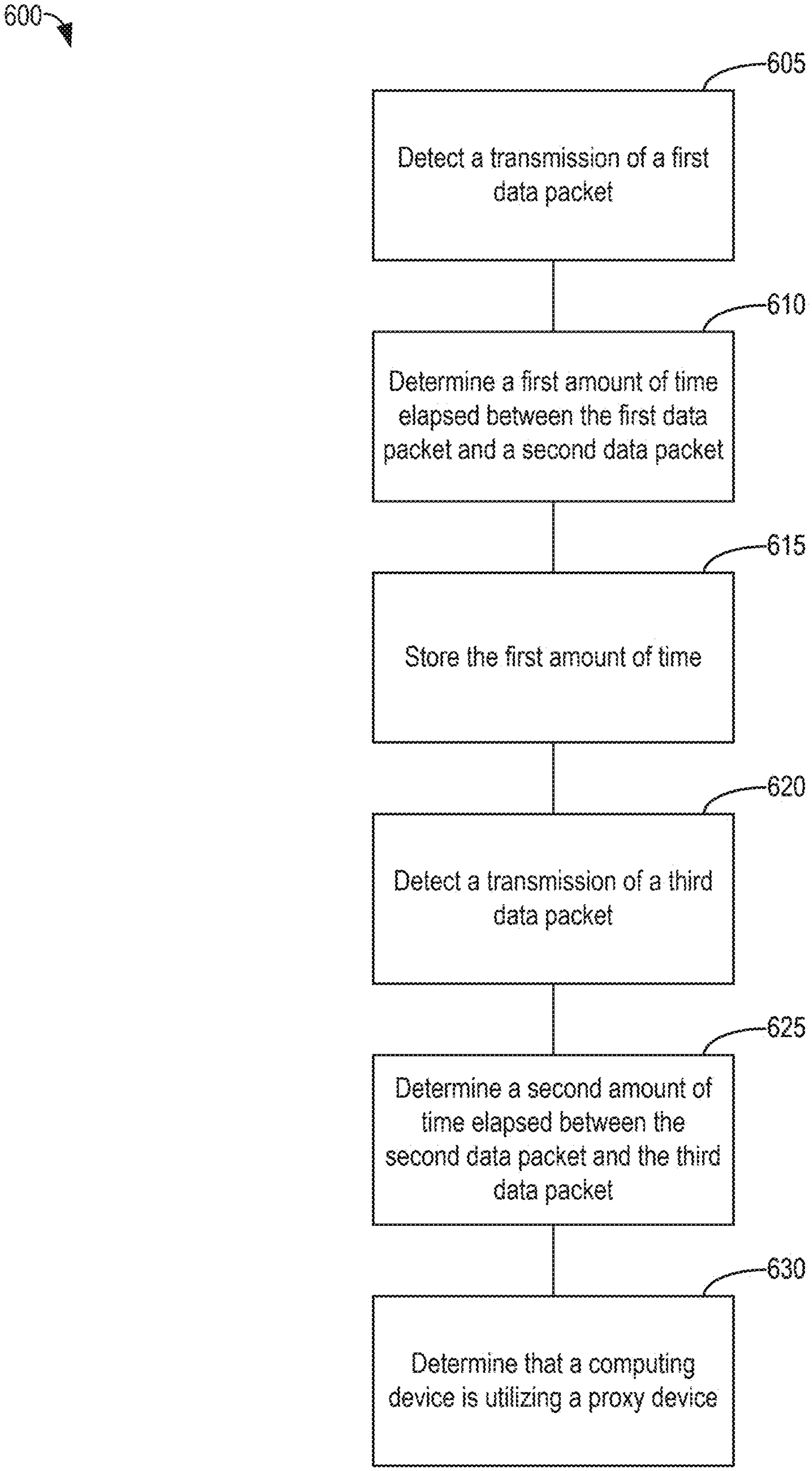
FIG. 6 is a method for proxy device detection, in accordance with an implementation.

FIG. 6 is a method 600 for proxy device detection, in accordance with an implementation. The method 600 can be performed by one or more system, component or module depicted in FIGS. 1 and/or 7A-7C, including, for example, a data processing system or service of a cloud service provider system. The method 600 may include more or fewer operations and the operations may be performed in any order. Performance of the method 600 may enable the data processing system to detect utilization of one or more proxy devices by client devices connecting with a destination.

At operation 605, the data processing system detects a transmission of a first data packet. For example, the data processing system can detect the transmission of a SYN-ACK data packet. As another example, the data processing system can detect transmission of a data packet, by the destination, that is responsive to transmission of a data packet from a client device.

At operation 610, the data processing system determines a first amount of time elapsed between the first data packet and a second data packet. For example, the data processing system may determine a round trip time that begins when the destination sends the SYN-ACK data packet (e.g., a first data packet) and ends when a corresponding ACK data packet (e.g., a second data packet) is receive. As another example, the data processing system may determine an amount of time to establish a communication session (e.g., establish a transport layer session). In some embodiments, the first amount of time may refer to and/or include the time $T_t$.

At operation 615, the data processing system stores the first amount of time. For example, the data processing system may store the first amount of time in a database. As another example, the data processing system may store the first amount of time as a data structure. In some embodiments, the data processing system may apply one or more tags to the first amount of time. The tags may provide assistance during subsequent retrieval. For example, the data processing system may apply a tag, to the first amount of time, which indicates a corresponding IP address (e.g., an IP address associated with the device that transmitted the data packet).

In operation 620, the data processing system detects a transmission of a third data packet. For example, the data processing system may detect transmission of a higher layer data packet responsive to establishment of a lower layer communication session. As another example, the data processing system may detect transmission of a TLS ClientHello data packet (e.g., an application layer data packet, a session layer data packet, etc.). In some embodiments, the data processing system may detect the third data packet by monitoring inbound traffic to a network.

In operation 625, the data processing system determines a second amount of time elapsed between the second data packet and the third data packet. For example, the data processing system may determine a RTT that captures the amount of time between the establishment of communication at a lower layer (e.g., transport layer) and an initial transmission of a data packet at a higher layer (e.g., application layer, session layer, etc.). As another example, the data processing system may evaluate timestamps associated with transmission of the second data packet and the third data packet to determine an amount of time that elapsed between the two data packets. In some embodiments, the second amount of time may refer to and/or include at least one of the time $T_a$ and/or the time $T_{t-a}$. For example, the data processing system may determine the second amount of time during passive proxy device detection. As another example, the data processing system may determine the second amount of time during active proxy device detection.

In operation 630, the data processing system determines that a computing device is utilizing a proxy device. For example, the data processing system may determine that a client device is utilizing a proxy device to communicate with a destination responsive to the second amount of time exceed the first amount of time. Stated otherwise, the amount of time elapsed between the establishment of a lower layer session and the initial transmission of a higher layer data packet exceeds the amount of time to establish the lower layer session. In some embodiments, the data processing system may tag an underlying IP address (e.g., an IP address associated with the device that has been communicating with the destination) as a proxy device. The data processing system may tag the IP address as a proxy device for tracking of a total number of proxy devices on a network. In some embodiments, the data processing system may tag the IP address as a proxy device to inform the destination that corresponding communication is with a proxy device instead of an underlying client device.

Figure 7A:
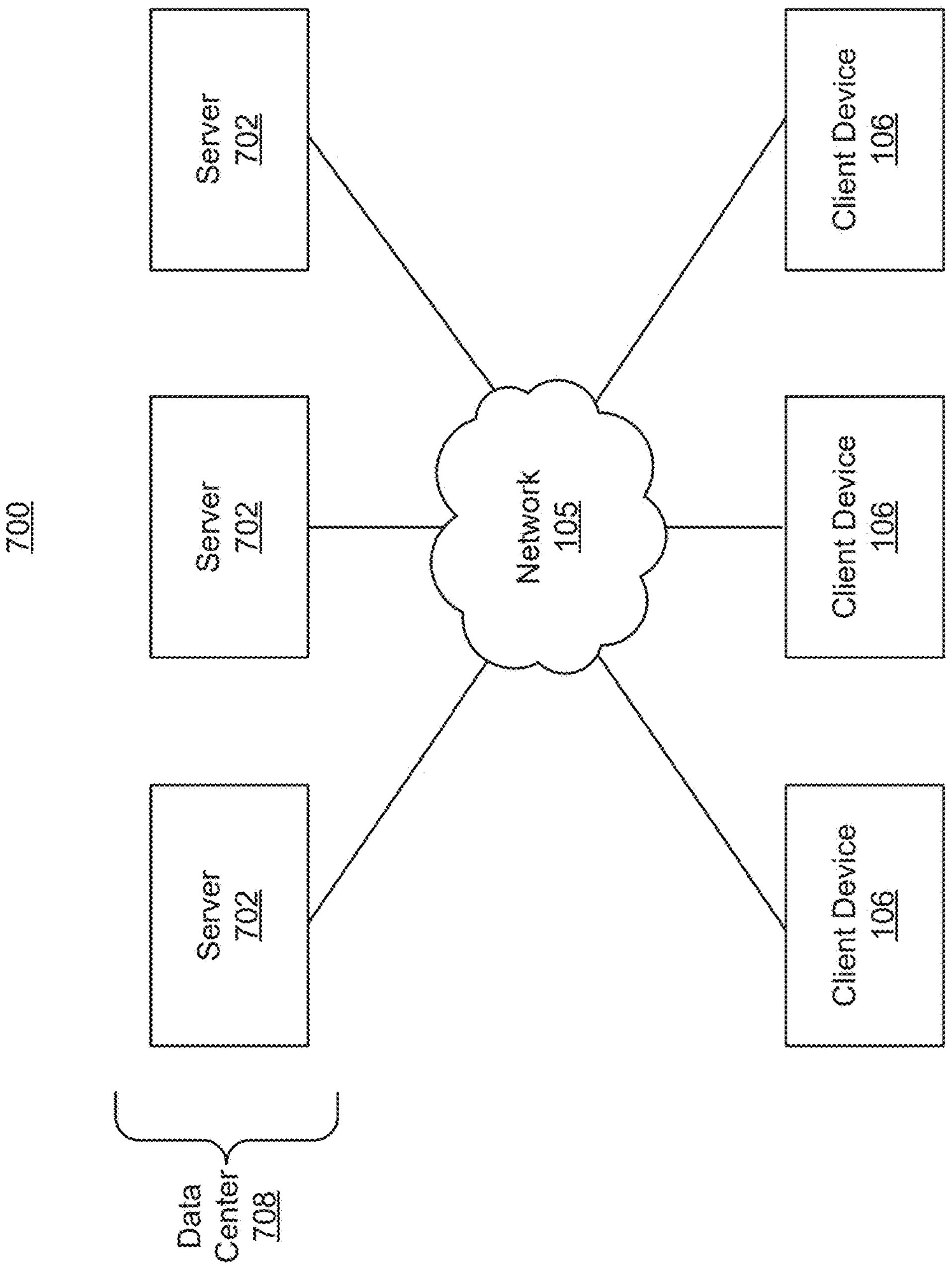
FIG. 7A is a block diagram depicting an implementation of a network environment including a client device in communication with a server device, in accordance with an implementation.

FIG. 7A depicts an example network environment that can be used in connection with the methods and systems described herein. In brief overview, the network environment 700 includes one or more client devices 106 (also generally referred to as clients, client node, client machines, client computers, client computing devices, endpoints, or endpoint nodes) in communication with one or more servers 702 (also generally referred to as servers, nodes, or remote machine) via one or more networks 105. In some embodiments, the client device 106 has the capacity to function as both a client node seeking access to resources provided by a server and as a server providing access to hosted resources for other client devices 106.

Although FIG. 7A shows the network 105 between the client devices 106 and the servers 702, the client devices 106 and the servers 702 can be on the same network 105. In embodiments, there are multiple networks 105 between the client devices 106 and the servers 702. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g., FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g., Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 700 can include multiple, logically grouped servers 702. The logical group of servers can be referred to as a data center 708 (or server farm or machine farm). In embodiments, the servers 702 can be geographically dispersed. The data center 708 can be administered as a single entity or different entities. The data center 708 can include multiple data centers 708 that can be geographically dispersed. The servers 702 within each data center 708 can be homogeneous or heterogeneous (e.g., one or more of the servers 702 or machines can operate according to one type of operating system platform (e.g., WINDOWS NT, manufactured by Microsoft Corp. of Redmond, Washington), while one or more of the other servers 702 can operate on according to another type of operating system platform (e.g., Unix, Linux, or Mac OS X)). The servers 702 of each data center 708 do not need to be physically proximate to another server 702 in the same machine farm. Thus, the group of servers 702 logically grouped as the data center 708 can be interconnected using a network. Management of the data center 708 can be de-centralized. For example, one or more servers 702 can comprise components, subsystems, and modules to support one or more management services for the data center 708.

Server 702 can be a file server, application server, web server, proxy server, appliance, network appliance, gateway, gateway server, virtualization server, deployment server, SSL VPN server, or firewall. In embodiments, the server 702 can be referred to as a remote machine or a node. Multiple nodes can be in the path between any two communicating servers.

Figure 7B:
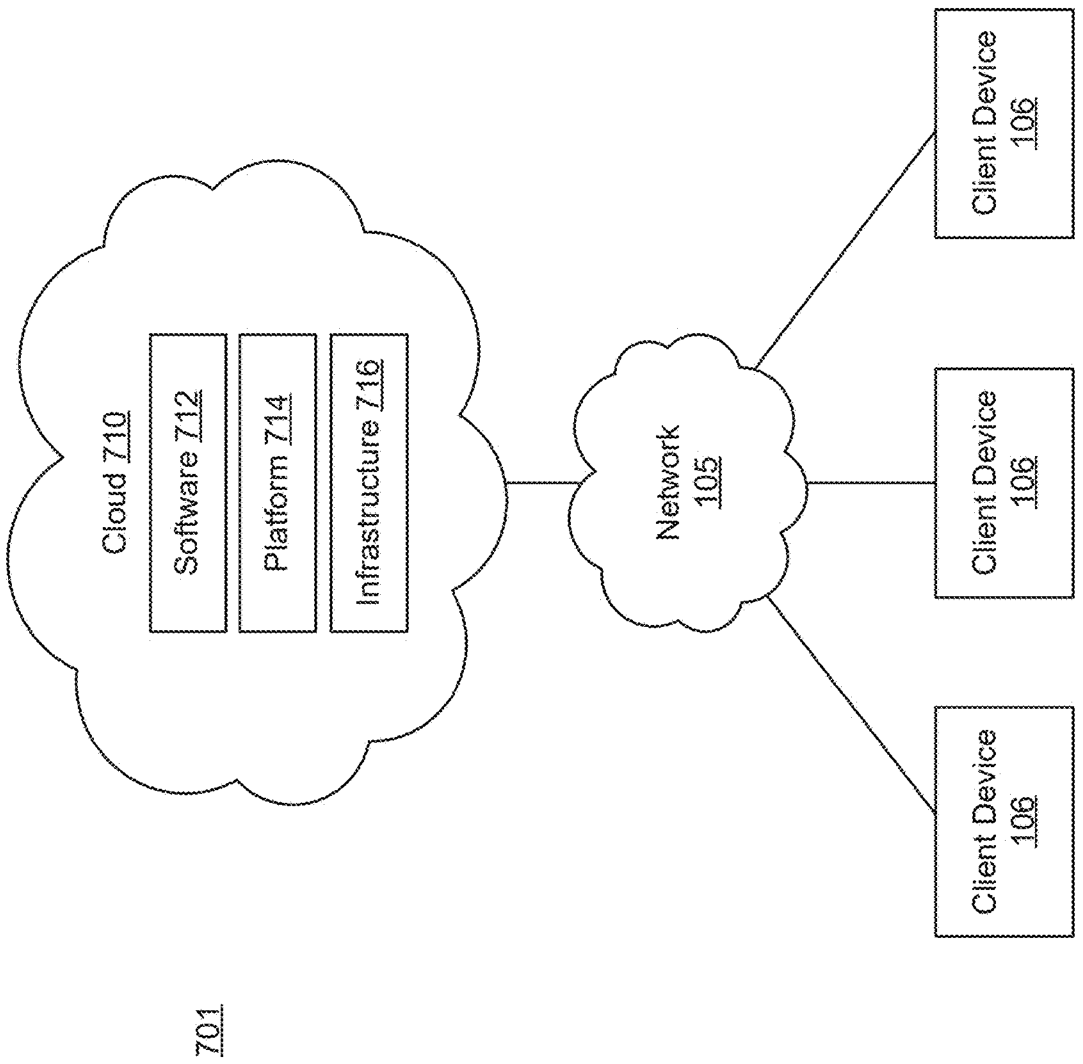
FIG. 7B is a block diagram depicting a cloud computing environment including a client device in communication with cloud service providers, in accordance with an implementation.

FIG. 7B illustrates an example cloud computing environment. A cloud computing environment 701 can provide the client device 106 with one or more resources provided by a network environment. The cloud computing environment 701 can include one or more client devices 106, in communication with the cloud 710 over one or more networks 105. Client devices 106 can include, e.g., thick clients, thin clients, and zero clients. A thick client can provide at least some functionality even when disconnected from the cloud 710 or servers 702. A thin client or a zero client can depend on the connection to the cloud 710 or server 702 to provide functionality. A zero client can depend on the cloud 710 or other networks 105 or servers 702 to retrieve operating system data for the client device. The cloud 710 can include back-end platforms, e.g., the servers 702, storage, server farms or data centers.

The cloud 710 can be public, private, or hybrid. Public clouds can include public servers 702 that are maintained by third parties to the client devices 106 or the owners of the clients. The servers 702 can be located off-site in remote geographical locations as disclosed above or otherwise. Public clouds can be connected to the servers 702 over a public network. Private clouds can include private servers 702 that are physically maintained by client devices 106 or owners of clients. Private clouds can be connected to the servers 702 over a private network 105. Hybrid clouds can include both the private and public networks 105 and servers 702.

The cloud 710 can also include a cloud-based delivery, e.g., Software as a Service (Saas) 712, Platform as a Service (PaaS) 714, and the Infrastructure as a Service (IaaS) 716. IaaS can refer to a user renting the use of infrastructure resources that are needed during a specified time period. IaaS providers can offer storage, networking, servers, or virtualization resources from large pools, allowing the users to quickly scale up by accessing more resources as needed. PaaS providers can offer functionality provided by IaaS, including, e.g., storage, networking, servers, or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL), DTLS (Datagram Transport Layer Security), or other transmission mechanisms.

The client device 106 and the server 702 can be deployed as and/or executed on any type and form of computing device, e.g., a computer, network device or appliance capable of communicating on any type and form of network and performing the operations described herein.

Figure 7C:
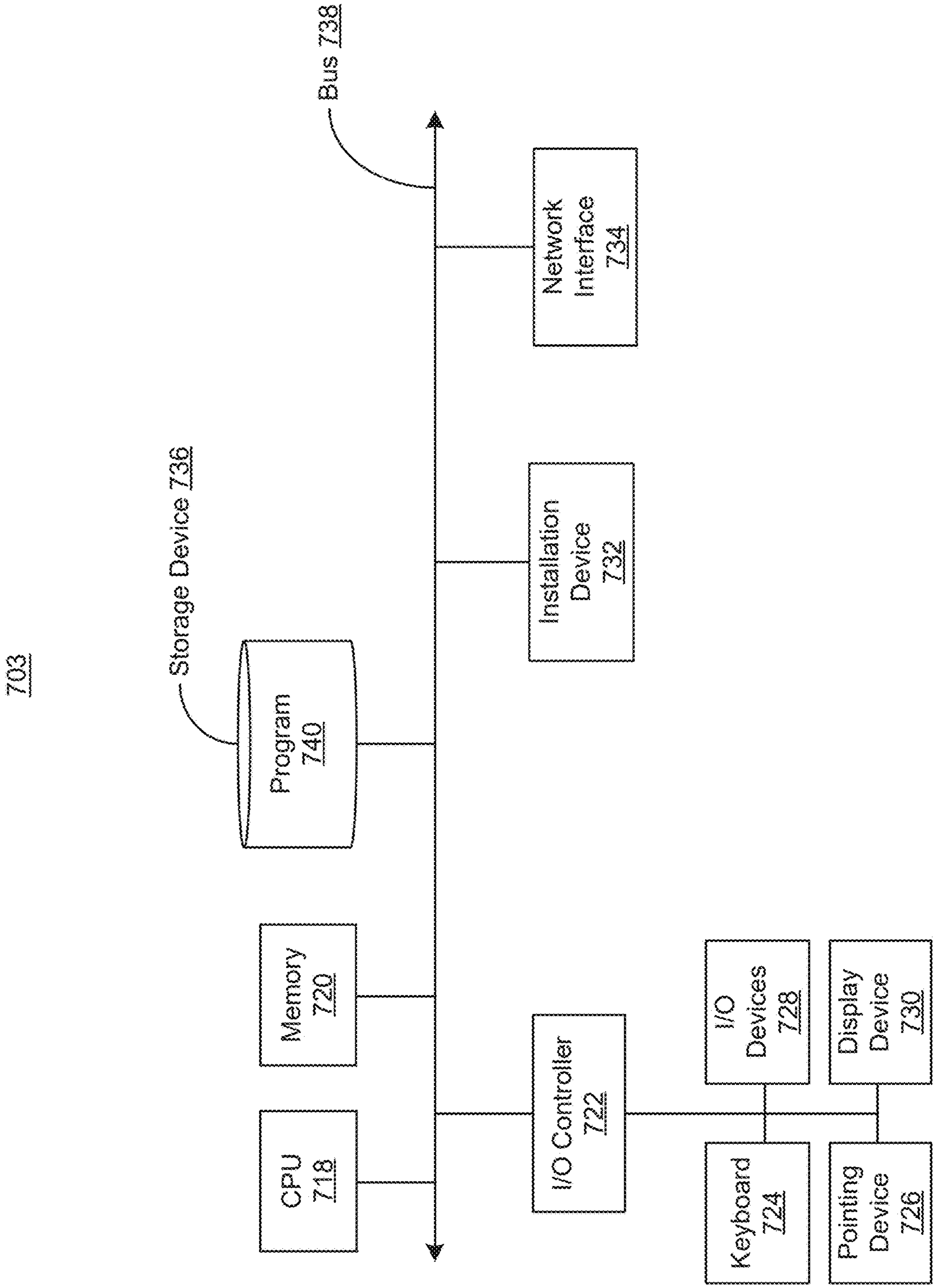
FIG. 7C is a block diagram depicting an implementation of a computing device that can be used in connection with the system depicted in FIG. 1, and the methods and processes depicted in FIGS. 2-6, in accordance with an implementation.

FIG. 7C depict a block diagram of the computing device 703 useful for practicing an embodiment of the client device 106 or the server 702. As shown in FIG. 7C, each computing device 703 can include a central processing unit 718, and a main memory unit (shown as memory 720), a computing device 703 can include one or more of a storage device 736, an installation device 732, a network interface 734, an I/O controller 722, a display device 730, a keyboard 724, a pointing device 726 (e.g., a mouse), and an I/O device 728. The storage device 736 can include, without limitation, a program 740, such as an operating system, software, or software associated with system 100.

The central processing unit 718 is any logic circuitry that responds to, and processes instructions fetched from memory 720. The central processing unit 718 can be provided by a microprocessor unit, e.g.: those manufactured by Intel Corporation of Mountain View, California. The computing device 703 can be based on any of these processors, or any other processor capable of operating as described herein. The central processing unit 718 can utilize instruction level parallelism, thread level parallelism, different levels of cache, and multi-core processors. A multi-core processor can include two or more processing units on a single computing component.

Memory 720 can include one or more memory chips capable of storing data and allowing any storage location to be directly accessed by the central processing unit 718. Memory 720 can be volatile and faster than storage device 736. Memory 720 can be Dynamic random-access memory (DRAM) or any variants, including static random access memory (SRAM). Memory 720 or the storage device 736 can be non-volatile; e.g., non-volatile read access memory (NVRAM). Memory 720 can be based on any type of memory chip, or any other available memory chips. In the example depicted in FIG. 7C, the central processing unit 718 can communicate with memory 720 via a system bus 738.

The I/O device 728 can be present in the computing device 703. The I/O device 728 can include keyboards, mice, trackpads, trackballs, touchpads, touch mice, multi-touch touchpads and touch mice, microphones, multi-array microphones, drawing tablets, cameras, or other sensors. The I/O device 728 include video displays, graphical displays, speakers, headphones, or printers.

The I/O device 728 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. The I/O device 728, the display device 730, or a group of devices can be augmented reality devices. The I/O devices can be controlled by the I/O controller 722 as shown in FIG. 7C. The I/O controller 722 can control one or more I/O devices, such as, e.g., the keyboard 724 and the pointing device 726, e.g., a mouse or optical pen. Furthermore, an I/O device can also provide storage and/or the installation device 732 for the computing device 703. In embodiments, the computing device 703 can provide USB connections (not shown) to receive handheld USB storage devices. In embodiments, the I/O device 728 can be a bridge between the system bus 738 and an external communication bus, e.g., a USB bus, a SCSI bus, a Fire Wire bus, an Ethernet bus, a Gigabit Ethernet bus, a Fiber Channel bus, or a Thunderbolt bus.

In embodiments, the display device 730 can be connected to the I/O controller 722. Display devices can include, e.g., liquid crystal displays (LCD), electronic papers (e-ink) displays, flexile displays, light emitting diode displays (LED), or other types of displays. In some embodiments, the display device 730 or the I/O controller 722 can be controlled through or have hardware support for OPENGL or DIRECTX API or other graphics libraries. Any of the I/O device 728 and/or the I/O controller 722 can include any type and/or form of suitable hardware, software, or combination of hardware and software to support, enable or provide for the connection and use of one or more display devices (e.g., the display device 730) by the computing device 703. For example, the computing device 703 can include any type and/or form of video adapter, video card, driver, and/or library to interface, communicate, connect, or otherwise use the display devices 730. In embodiments, a video adapter can include multiple connectors to interface to multiple display devices (e.g., the display device 730).

The computing device 703 can include the storage device 736 (e.g., one or more hard disk drives or redundant arrays of independent disks) for storing an operating system or other related software, and for storing application software programs (e.g., the program 740) such as any program related to the systems, methods, components, modules, elements, or functions depicted in FIG. 1. Examples of the storage device 736 include, e.g., hard disk drive (HDD); optical drive including CD drive, DVD drive, or BLU-RAY drive; solid-state drive (SSD); USB flash drive; or any other device suitable for storing data. The storage device 736 can include multiple volatile and non-volatile memories, including, e.g., solid state hybrid drives that combine hard disks with solid state cache. The storage device 736 can be non-volatile, mutable, or read-only. The storage device 736 can be internal and connect to the computing device 703 via the system bus 738. The storage device 736 can be external and connect to the computing device 703 via the I/O device 728 that provides an external bus. The storage device 736 can connect to the computing device 703 via the network interface 734 over a network 105. Some client devices 106 may not require a non-volatile device (e.g., the storage device 736) and can be thin clients or zero client devices 106. The storage device 736 can be used as the installation device 732 and can be suitable for installing software and programs.

The computing device 703 can include the network interface 734 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 703 can communicate with other computing devices via any type and/or form of gateway or tunneling protocol e.g., Secure Socket Layer (SSL) or Transport Layer Security (TLS), QUIC protocol, or the Citrix Gateway Protocol manufactured by Citrix Systems, Inc. of Ft. Lauderdale, Florida. The network interface 734 can include a built-in network adapter, network interface card, PCMCIA network card, EXPRESSCARD network card, card bus network adapter, wireless network adapter, USB network adapter, modem, or any other device suitable for interfacing the computing device 703 to any type of network capable of communication and performing the operations described herein.

The computing device 703 can operate under the control of an operating system, which controls scheduling of tasks and access to system resources. The computing device 703 can be running any operating system configured for any type of computing device, including, for example, a desktop operating system, a mobile device operating system, a tablet operating system, or a smartphone operating system.

The computing device 703 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 703 has sufficient processor power and memory capacity to perform the operations described herein. In some embodiments, the computing device 703 can have different processors, operating systems, and input devices consistent with the device.

In some embodiments, the status of one or more of the client devices 106 and/or the computing device 703, in the network 105, can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 703 in response to the central processing unit 718 executing an arrangement of instructions contained in memory 720. Such instructions can be read into memory 720 from another computer-readable medium, such as the storage device 736. Execution of the arrangement of instructions contained in memory 720 causes the computing device 703 to perform the illustrative processes described herein. One or more processors in a multi-processing arrangement may also be employed to execute the instructions contained in memory 720. Hard-wired circuitry can be used in place of or in combination with software instructions together with the systems and methods described herein. Systems and methods described herein are not limited to any specific combination of hardware circuitry and software.

Although an example computing system has been described in FIG. 7A, the subject matter including the operations described in this specification can be implemented in other types of digital electronic circuitry, or in computer software, firmware, or hardware, including the structures disclosed in this specification and their structural equivalents, or in combinations of one or more of them.

At least one aspect is directed to a system. The system can include one or more memory devices. The one or more memory devices can store instructions thereon. The instructions can, when executed by one or more processors, cause the one or more processors to detect, based on information associated with a plurality of data packet exchanges of a network, a transmission of a first data packet between a computing device and a server. The first data packet can initiate an establishment of a communication session between the computing device and the server. The instructions can cause the one or more processors to determine, responsive to detection of a transmission of a second data packet between the computing device and the server, a first amount of time elapsed between the transmission of the first data packet and the transmission of the second data packet. The second data packet can indicate the establishment of the communication session between the computing device and the server. The instructions can cause the one or more processors to store the first amount of time in a data structure in a database. The instructions can cause the one or more processors to detect, responsive to monitoring subsequent interactions between the computing device and the server, a transmission of a third data packet between the computing device and the server. The instructions can cause the one or more processors to determine, responsive to detection of the transmission of the third data packet, a second amount of time elapsed between the transmission of the second data packet and the transmission of the third data packet. The instructions can cause the one or more processors to determine, based on a difference between the first amount of time and the second amount of time, that the computing device is utilizing a proxy device to communicate with the server.

At least one aspect is directed to a method. The method can include detecting, by one or more processing circuits, based on information associated with a plurality of data packet exchanges of a network, a transmission of a first data packet between a computing device and a server. The first data packet can initiate an establishment of a communication session between the computing device and the server. The method can include determining, by the one or more processing circuits, responsive to detecting a transmission of a second data packet between the computing device and the server, a first amount of time elapsed between the transmission of the first data packet and the transmission of the second data packet. The second data packet can indicate the establishment of the communication session between the computing device and the server. The method can include storing, by the one or more processing circuits, the first amount of time in a data structure in a database. The method can include detecting, by the one or more processing circuits, responsive to monitoring subsequent interactions between the computing device and the server, a transmission of a third data packet between the computing device and the server. The method can include determining, by the one or more processing circuits, responsive to detecting the transmission of the third data packet, a second amount of time elapsed between the transmission of the second data packet and the transmission of the third data packet. The method can include determining, by the one or more processing circuits, based on a difference between the first amount of time and the second amount of time, that the computing device is utilizing a proxy device to communicate with the server.

At least one aspect is directed to a non-transitory computer readable storage medium. The non-transitory computer readable storage medium can include instructions stored thereon. The instructions can, when executed by one or more processors, cause the one or more processors to perform operations that include detecting, based on information associated with a plurality of data packet exchanges of a network, a transmission of a first data packet between a computing device and a server. The first data packet can initiate an establishment of a communication session between the computing device and the server. The operations can include determining, responsive to detecting a transmission of a second data packet between the computing device and the server, a first amount of time elapsed between the transmission of the first data packet and the transmission of the second data packet. The second data packet can indicate the establishment of the communication session between the computing device and the server. The operations can include storing the first amount of time in a data structure in a database. The operations can include detecting, responsive to monitoring subsequent interactions between the computing device and the server, a transmission of a third data packet between the computing device and the server. The operations can include determining, responsive to detecting the transmission of the third data packet, a second amount of time elapsed between the transmission of the second data packet and the transmission of the third data packet. The operations can include determining, based on a difference between the first amount of time and the second amount of time, that the computing device is utilizing a proxy device to communicate with the server.

The foregoing detailed description includes illustrative examples of various aspects and embodiments and provides an overview or framework for understanding the nature and character of the claimed aspects and embodiments. The drawings provide illustration and a further understanding of the various aspects and embodiments and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms “computing device” or “component” encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file on a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all embodiments, and the described program components can be included in a single hardware or software product.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any implementation or element or act herein may also embrace embodiments including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A,' only 'B,' as well as both 'A' and 'B.' Such references used in conjunction with "comprising" or other open terminology can include additional items.

The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system comprising one or more memory devices storing instructions thereon that, when executed by one or more processors, cause the one or more processors to:

detect, based on information associated with a plurality of data packet exchanges of a network, a transmission of a first data packet between a computing device and a server, the first data packet to initiate an establishment of a communication session between the computing device and the server, wherein the first data packet is transmitted in accordance with a first layer of a network architecture;

determine, responsive to detection of a transmission of a second data packet between the computing device and the server, a first amount of time elapsed between the transmission of the first data packet and the transmission of the second data packet, the second data packet to indicate the establishment of the communication session between the computing device and the server, wherein the second data packet is transmitted in accordance with the first layer of the network architecture;

store the first amount of time in a data structure in a database;

detect, responsive to monitoring subsequent interactions between the computing device and the server, a transmission of a third data packet between the computing device and the server, wherein the third data packet is transmitted in accordance with a second layer of the network architecture, the second layer being different than the first layer;

determine, responsive to detection of the transmission of the third data packet, a second amount of time elapsed between the transmission of the second data packet and the transmission of the third data packet;

determine, based on a difference between the first amount of time and the second amount of time, that the computing device is utilizing a proxy device to communicate with the server; and block, based on the determination that the computing device is utilizing the proxy device, the proxy device from communicating across the network, wherein the plurality of data packet exchanges comprise encrypted data packet exchanges.

2. The system of claim 1, wherein the first data packet is transmitted by the server in accordance with a first layer of a network architecture, and wherein the second data packet is transmitted by the computing device in accordance with the first layer of the network architecture.

3. The system of claim 2, wherein the third data packet is transmitted by the computing device in accordance with a second layer of the network architecture, and wherein the second layer is different than the first layer.

4. The system of claim 3, wherein the first layer is a transport control protocol (TCP) layer or a user datagram protocol (UDP) layer, and wherein the second layer is an application layer.

5. The system of claim 3, wherein the first layer is a transport layer, and wherein the second layer is a session layer.

6. The system of claim 1, wherein the instructions cause the one or more processors to:

update, based on the computing device utilizing the proxy device, a count to reflect that the computing device is utilizing the proxy device, wherein the count represents a number of computing devices utilizing proxy devices to communicate across the network;

determine, responsive to the update of the count, that the number of computing devices exceeds a second predetermined threshold; and detect, responsive to determination that the number of computing devices exceeds the second predetermined threshold, a network attack on the network.

7. The system of claim 6, wherein the network attack includes a distributed denial of service (DDoS) attack.

8. The system of claim 1, wherein the instructions cause the one or more processors to:

detect, based on a number of computing devices utilizing proxy devices to communicate across the network, an attack on the network; and block, based at least on the determination that the computing device is utilizing the proxy device, the proxy device from communicating across the network.

9. The system of claim 1, wherein the instructions cause the one or more processors to:

cause, responsive to detection of the transmission of the second data packet, the server to transmit a redirection response to the computing device; and wherein the redirection response prompts the computing device to transmit a response to the redirection response;

wherein the third data packet is the response to the redirection response.

10. The system of claim 1, wherein the first data packet includes a first initial sequence number, and wherein the second data packet includes a second initial sequence number.

11. The system of claim 1, wherein the third data packet is transmitted responsive to the establishment of the communication session between the computing device and the server.

12. A method, comprising:

detecting, by one or more processing circuits, based on information associated with a plurality of data packet exchanges of a network, a transmission of a first data packet between a computing device and a server, the first data packet to initiate an establishment of a communication session between the computing device and the server, wherein the first data packet is transmitted in accordance with a first layer of a network architecture;

determining, by the one or more processing circuits, responsive to detecting a transmission of a second data packet between the computing device and the server, a first amount of time elapsed between the transmission of the first data packet and the transmission of the second data packet, the second data packet to indicate the establishment of the communication session between the computing device and the server, wherein the second data packet is transmitted in accordance with the first layer of the network architecture;

storing, by the one or more processing circuits, the first amount of time in a data structure in a database;

detecting, by the one or more processing circuits, responsive to monitoring subsequent interactions between the computing device and the server, a transmission of a third data packet between the computing device and the server, wherein the third data packet is transmitted in accordance with a second layer of the network architecture, the second layer being different than the first layer;

determining, by the one or more processing circuits, responsive to detecting the transmission of the third data packet, a second amount of time elapsed between the transmission of the second data packet and the transmission of the third data packet;

determining, by the one or more processing circuits, based on a difference between the first amount of time and the second amount of time, that the computing device is utilizing a proxy device to communicate with the server; and blocking, by the one or more processing circuits, based on the determination that the computing device is utilizing the proxy device, the proxy device from communicating across the network, wherein the plurality of data packet exchanges comprise encrypted data packet exchanges.

13. The method of claim 12, wherein the first data packet is transmitted by the server in accordance with a first layer of a network architecture, and wherein the second data packet is transmitted by the computing device in accordance with the first layer of the network architecture.

14. The method of claim 13, wherein the third data packet is transmitted by the computing device in accordance with a second layer of the network architecture, and wherein the second layer is different than the first layer.

15. The method of claim 14, wherein the first layer is a transport control protocol (TCP) layer or a user datagram protocol (UDP) layer, and wherein the second layer is an application layer.

16. The method of claim 14, wherein the first layer is a transport layer, and wherein the second layer is a session layer.

17. The method of claim 12, further comprising:

updating, by the one or more processing circuits, based on the computing device utilizing the proxy device, a count to reflect that the computing device is utilizing the proxy device, wherein the count represents a number of computing devices utilizing proxy devices to communicate across the network;

determining, by the one or more processing circuits, responsive to updating the count, that the number of computing devices exceeds a second predetermined threshold; and detecting, by the one or more processing circuits, responsive to determination that the number of computing devices exceeds the second predetermined threshold, a network attack on the network.

18. One or more non-transitory storage medium storing instructions thereon that, when executed by one or more processors, cause the one or more processors to perform operations comprising:

detecting, based on information associated with a plurality of data packet exchanges of a network, a transmission of a first data packet between a computing device and a server, the first data packet to initiate an establishment of a communication session between the computing device and the server, wherein the first data packet is transmitted in accordance with a first layer of a network architecture;

determining, responsive to detecting a transmission of a second data packet between the computing device and the server, a first amount of time elapsed between the transmission of the first data packet and the transmission of the second data packet, the second data packet to indicate the establishment of the communication session between the computing device and the server, wherein the second data packet is transmitted in accordance with the first layer of the network architecture;

storing the first amount of time in a data structure in a database;

detecting, responsive to monitoring subsequent interactions between the computing device and the server, a transmission of a third data packet between the computing device and the server, wherein the third data packet is transmitted in accordance with a second layer of the network architecture, the second layer being different than the first layer;

determining, responsive to detecting the transmission of the third data packet, a second amount of time elapsed between the transmission of the second data packet and the transmission of the third data packet;

determining, based on a difference between the first amount of time and the second amount of time, that the computing device is utilizing a proxy device to communicate with the server; and blocking, based on the determination that the computing device is utilizing the proxy device, the proxy device from communicating across the network, wherein the plurality of data packet exchanges comprise encrypted data packet exchanges.

19. The one or more non-transitory storage medium of claim 18, wherein the first data packet is transmitted by the server in accordance with a first layer of a network architecture, and wherein the second data packet is transmitted by the computing device in accordance with the first layer of the network architecture.

20. The one or more non-transitory storage medium of claim 19, wherein the third data packet is transmitted by the computing device in accordance with a second layer of the network architecture, and wherein the second layer is different than the first layer.

* * * * *